Patented Sept. 14, 1954

2,689,040

UNITED STATES PATENT OFFICE 2,689,040

PROCESSING OF SULFUR-VULCANIZABLE MATERIALS AND RELATED COMPOSITIONS AND ARTICLES

John C. Hillyer, Bartlesville, and Daniel A. Nicewander, Elk City, Okla., assignors to Phillips Petroleum Company, a corporation of Delaware No Drawing. Application April 6, 1951, Serial No. 219,770

26 Claims. (Cl. 206—84)

This invention relates to plasticizers and extenders and their utilization in processing sulfur-vulcanizable organic plastic substances containing unsaturated carbon-to-carbon bonds, and to compositions associated with such processing. In one embodiment this invention relates to a method for plasticizing natural and synthetic rubbers. In another embodiment this invention relates to new compositions comprising natural and synthetic rubbers each incorporated with a polycyclic aldehyde produced by the interreaction of a butadiene and a furfural. This application is a continuation-in-part of our copending application, Serial No. 81,413, filed March 14, 1949.

Rubber stocks are tough and nonplastic and must be softened or rendered in a plastic condition to readily absorb ingredients incorporated therewith in the processing of these materials. Exemplary of such ingredients are suitable reinforcing pigments such as carbon black, fillers such as zinc oxide, various accelerators, sulfur and the like which are among those which in various combinations impart improvements to the final vulcanizate, with respect to such characteristics as for example, abrasion, flex life, hysteresis, resistance to tear, tensile strength, elongation, modulus, and the like.

Mixing of tough rubber stocks with compounding ingredients is effected generally by means of mastication or softening, i. e., plasticization, at a controlled temperature in the range of 50–350° F. Mastication involves mechanically kneading the rubber material, either by passing it through an open mill, i. e., passing it between rollers running at different speeds whereby it is subjected to compression followed by a shearing action, or by placing it in an enclosed mixer of the Banbury type where much the same effect is produced. The open mill and the Banbury type mixer comprise standard equipment in compounding rubber. Various known agents are used to accelerate milling by virtue of their affinity for the rubber or rubber-like material and are referred to hereinafter as "plasticizers" or "softeners", i. e., as applied to synthetic, natural, and reclaimed rubber.

Various types of materials have been employed as softeners or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished product, i. e., the vulcanizate, is of little value for many purposes. One of the disadvantages of some synthetic elastomers is that they do not possess sufficient tack. A plasticizer which gives a product of improved tack as well as other good physical properties is highly desirable.

We have now discovered novel softeners and extenders, which by their incorporation with rubber stocks, are good rubber plasticizers and tackifiers and also impart other desirable properties to the rubber. These materials are applicable in compounding natural and synthetic rubbers and reclaimed rubber, and they can be used alone as softeners and tackifiers in a compounding recipe or as mixtures with each other, or in conjunction with other softeners. They are effective not only as plasticizers and tackifiers but the rubber in which they are used shows particularly good flex life and tensile strength.

An object of this invention is to provide new and novel plasticizers and extenders for utilization with natural and synthetic rubbers. Another object is to provide a method for plasticizing and extending sulfur-vulcanizable organic plastic substances containing unsaturated carbon-to-carbon bonds. Another object is to provide new compositions each comprising a sulfur-vulcanizable organic plastic substance containing unsaturated carbon-to-carbon bonds, incorporated with an aldehydic polymer produced by the interreaction of a butadiene or a selected homologue thereof, with a furfural or a selected homologue thereof. Another object is to provide selected vulcanizates as new compositions. Another object is to provide improved softeners which impart desirable swelling and extractability characteristics to Perbunan rubbers. Other objects will be apparent to one skilled in the art from the accompanying discussion and disclosure.

The term "sulfur-vulcanizable organic plastic substance containing unsaturated carbon-tocarbon bonds" herein is meant to be generic to natural rubber, synthetic rubber, and reclaimed rubber.

In accordance with our invention we have provided a method for plasticizing and extending sulfur-vulcanizable organic plastic substances containing unsaturated carbon-to-carbon bonds, and new compositions comprising such organic plastic substances incorporated with an aldehydic polymer produced by the interreaction of a butadiene with a furfural. We have discovered that natural rubber, and sulfur-vulcanizable synthetic rubber-like materials or rubber substitutes, i. e., synthetic rubbers, as for example butadient-styrene copolymer, Perbunan, Butyl rubber, neoprene and the like, and reclaimed rubber, can be plasticized and extended by the incorporation therewith of an aldehydic polymer of the type described, which functions also as an extender therefor.

As we have disclosed in our earlier filed copending application referred to, a diolefin such as 1,3-butadiene and its immediate homologues may be reacted with a furfural such as furfural and its immediate homologues, to produce new products including aldehydic polymers which have a polycyclic structure. Since these polycyclic products are generally produced in a mixture also containing polymers of butadiene, polymers of furfural, and other complex materials of a polymeric nature, and since their chemical identities were originally unknown, the term "polymers" and "copolymers" have been loosely applied to these polycyclic chemical compounds as well as to these other polymeric materials. In view of the identification of certain of these materials as definite compounds, as discussed herein, the use of the term "polymers" tends to be misleading and the products are more accurately defined as polycyclic reaction products. When reacting 1,3-butadiene with furfural, one of the major reaction products is a pale yellow or amber colored oil. The crude oil apparently is a somewhat complex mixture of various reaction products. It has a boiling range of from about 200° F. to about 320° F. under a pressure of about one millimeter of mercury absolute. The refractive index at 77° F. ranges from about 1.520 to about 1.530 and the specific gravity at 68° F. ranges from about 1.08 to 1.16. The average molecular weight is about 210. The physical properties of various fractions of the oil vary somewhat within the indicated boiling range. The average refractive index at 77° F. is about 1.526 while the average specific gravity at 68° F. is about 1.12.

In the fractional distillation of the oil so produced, various fractions may be obtained as products of the process. The physical properties of of the products may thus be varied somewhat by separating the oil into fractions having various boiling point ranges. For example, fractions of different viscosity may be obtained by fractional distillation to produce on the one hand an oil of low viscosity and on the other, an oil of high viscosity or one having a slurry-like consistency. The aldehydic content is variable depending on conditions used, in general the content is between 40 and 80 mol per cent, but under suitable operating conditions almost any value can be obtained. We have found, for instance, that the product distilling near the upper end of the boiling range is generally very low in aldehyde content. By pentane extraction of a lower boiling fraction on the other hand, a product of very high aldehydic content is obtained.

As a diolefin reactant in the preparation of the aldehydic polymer plasticizer-extender of our invention we prefer to use a conjugated diolefin, preferably one having not more than about seven carbon atoms per molecule. Such a diolefin can be referred to as a member of the group consisting of 1,3-butadiene and its immediate homologues and may be reported as having the formula

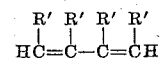

where each R' is of the group consisting of hydrogen and an alkyl group having not more than three carbon atoms and at least two R' 's are hydrogen. The furfural reactant employed can be referred to as one of the group consisting of furfural and its immediate homologues having not more than seven carbon atoms per molecule. Such a material may be said to be a compound having the formula

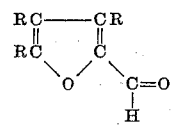

where each R is of the group consisting of hydrogen and methyl and at least one R is hydrogen. The more commonly used reactants are 1,3-butadiene and furfural, isoprene and furfural, and piperylene and furfural, and the corresponding diolefins with methyl furfural. It appears that in producing such an aldehyde reaction product, two molecules of the diolefins react with one molecule of the furfural reactant by a modification of the Diels-Alder reaction.

The aldehyde reaction products include compounds having the empirical formula

where $x$ is an integer not greater than 2 and $y$ is an integer not greater than 4. These aldehydes probably have the following structural formula

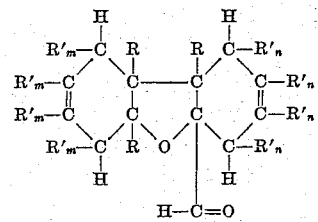

where each R is of the group consisting of hydrogen and methyl and at least one is hydrogen, and each R' is of the group consisting of hydrogen and an alkyl group having not more than three carbon atoms with the sum of the carbon atoms in the R'$_m$ and in the R'$_n$ in each case, not greater than three and at least two of the R'$_m$ and of the R'$_n$ are hydrogen.

A preferred mode of operation of our invention may be illustrated with a reaction system comprising furfural of approximately five per cent water content by weight and butadiene in concentrations from three to fifty per cent by weight. The system is charged to an autoclave and maintained at temperatures within the range of from about 200° F. to about 300° F. for from about 5 to about 100 hours. The reaction product is then removed, unchanged reactants stripped off, and the higher boiling portion fractionated under reduced pressure. Butadiene dimer, which may also be formed in an appreciable amount when temperature and butadiene concentrations are sufficiently high, distills at 97° F. under an absolute pressure of 23 mm. of mercury and is removed in the stripping process. The aldehydic polymeric plasticizer-extender materials of our invention are contained in the fraction distilling from about 150° F. to about 320° F. under an absolute pressure of about one mm. of mercury, which corresponds to about 450 to about 700° F. when converted to boiling temperatures at 760 mm. of mercury absolute. The major fraction of this material distills overhead between 190 and 275° F., under one mm. of mercury pressure.

The water content of the furfural used in some commercial extractive distillation units, such as those operating on butylene-butadiene separation, is usually about five weight per cent. Although anhydrous furfural may be successfully employed to produce the polycyclic aldehyde, the presence of water in furfural, particularly at a concentration near this value, is not detrimental to the operation of this embodiment of our invention. In fact, water appears to have some catalytic effect on the reaction of butadiene with furfural to produce our plasticizer-extender materials, and also enters into the reaction to produce a lactone. However, water present in the furfural in a concentration exceeding 10 to 20 per cent often accelerates a secondary condensation to form undesirable tarry substances which contaminate the aldehydic product, thus reducing its yield. High temperatures above about 300° F. may also accelerate such secondary condensations as already described and should be avoided. Temperature below 160° F. usually requires substantially extended time.

The polycyclic aldehydic plasticizer-extender material of this invention can be obtained as a by-product of an extractive distillation process involving the use of furfural as a selective solvent in the separation of butadiene from a butadiene-butene hydrocarbon mixture undergoing fractional distillation in a distillation column. In such a process the butadiene-butene stream is contacted with furfural generally containing from 4 to 6 weight per cent water. Temperatures in various parts of the extractive distillation system range up to about 325° F., and the total contact time of butadiene, water, and furfural in the extractive distillation column is sufficiently long to provide for some appreciable "side reaction", or condensation, of furfural with butadiene to form our polycyclic aldehydes, or of furfural with water and butadiene with the concomitant formation of some lactone by-product. The magnitude of such extractive distillation operations is such that large volumes of furfural are in constant circulation in the system, and thus even a low conversion of furfural provides large amounts of the aldehydic product.

In the separation of butadiene from a butene stream in accordance with the extractive distillation procedure above referred to, it is generally customary to divert a small proportion, usually about 1 or 2 per cent of the circulating furfural stream, to a furfural rerun system, generally a steam or vacuum redistillation system, for the purpose of removing by-product furfural polymers. In such a rerun system, the furfural-butadiene reaction product is separated from the furfural, as a part of a tarry bottoms product, containing large amounts of resinous furfural polymer and the above mentioned lactone product. Separation of the aldehydic polycyclic compound from the tar can be effected by means of high vacuum distillation generally at about 1 mm. absolute pressure or less. However if desired the total tarry residue can be employed without further purification as a plasticizer-extender in accordance with our invention. In fact, the polycyclic aldehydic product can be utilized in that capacity, in any state of purity desired.

Steam distillation when used in the removal of tar from the furfural side stream provides large amounts of water condensate which collect with the bottoms product. The aqueous phase thus formed carries in solution a large proportion of the polycyclic aldehyde and also the lactone by-product, each of which can be separated by further distillation.

It is a feature of our invention that it is unnecessary to utilize the polycyclic aldehyde formed during the extractive distillation described in a high state of purity, thus eliminating the cost of a final purification that would otherwise be required. We have found that we can use a crude polycyclic aldehyde-containing fraction recovered as a product of condensation of two mols of butadiene with one mol of furfural conducted under conditions already discussed herein, or effected as a side reaction in an extractive distillation method of the type already discussed. This feature is particularly advantageous when utilizing the by-product material obtained from the furfural purification step already described. The tarry phase, from the extractive distillation process as described, when distilled under reduced pressure yields the polycyclic aldehydic product material together with some of the lactone, and these products can be readily separated to isolate the aldehyde in any desired purity. However since the lactone materials so formed and present in the total by-product fraction do not adversely affect the function of the polycyclic aldehyde as a plasticizer-extender it is advantageous from an economic standpoint to permit their presence and to thereby eliminate purification costs.

Recovery of the polycyclic aldehyde-containing fraction from the steam condensate, when steam distillation is employed in the furfural rerun step, may be effected by evaporation of the water, and the residual product utilized as a plasticizer-extender in accordance with our invention. However when desired the residual product from such steam condensate distillation may be further treated, for example by means of solvent extraction, with a suitable selective solvent to remove the polycyclic aldehyde material in any desired degree of purity.

The preferred species of our extender-plasticizer material represented by the structural formula

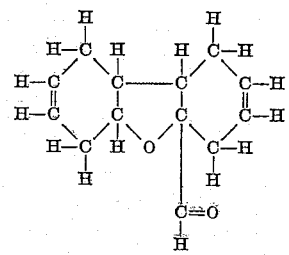

and is referred to as 2,3,4,5-bis($\Delta^2$-butenylene)-tetrahydrofurfural which species is produced by the interreaction of furfuraldehyde with 1,3-butadiene and is that formed during the specific extractive distillation process described hereinabove.

The proportions of the plasticizer-extender materials employed with respect to the rubber stock in accordance with our invention vary, depending upon the type rubber being processed and the properties desired in the finished product, i. e., the plasticizer-rubber product preceding or subsequent to vulcanization or both as desired. Generally the amount of plasticizer-extender employed is within the limits of from 1 to 50 parts by weight per 100 parts by weight of rubber stock. When plasticizing relatively high Mooney synthetic elastomers, for example those having raw Mooney values of 90 or above as for example as high as 160 (ML-4), it is usually advantageous to employ relatively large quantities of plasticizer, for example from 15 to 50 parts by weight per 100 parts by weight of rubber. When plasticizing relatively low Mooney synthetic elastomers, i. e., those having a raw Mooney value below 90, as from about 20 to 90, that amount is in the range of from about 1 to 25 parts, often from 2 to 10 parts. When referring herein to Mooney value, it is meant that Mooney viscosity as determined in accordance with the ASTM method, D927-49T.

We can incorporate the softeners of our invention with the material to be plasticized by any suitable method, such as (1) adding the softener either directly or as a dispersion to a synthetic rubber latex and then coagulating the latex in accordance with latex masterbatch procedure, or (2) introducing the softener on the mill.

Our invention is well applied to plasticization of Perbunan rubbers prepared by copolymerizing acrylonitrile and 1,3-butadiene in a range of ratios of 10:90 to 40:60 parts by weight. By incorporating the softener materials of our invention with a Perbunan rubber and vulcanizing the mixture, we are able to prepare rubber vulcanizates, which when contacted with hydrocarbons, particularly those comprising organic solvents, gasoline-like materials or jet fuels, exhibit particularly high swelling and low extractability characteristics.

Rubber or rubber-like materials containing the softeners of our invention are preferably cured or vulcanized for a period of time in the range of from 20 to 75 minutes. In the accompanying claims, reference to a vulcanizate or product of vulcanization of a rubber or rubber-like material compound with a softener material of my invention means that the vulcanization occurred after admixture of these materials with each other.

The following examples serve to further illustrate our process for plasticizing natural and synthetic rubber, and new and novel plasticizer-containing compositions formed in accordance with our invention, by which we mean to include those new compositions in their form before vulcanization and also after vulcanization. The reactants and their proportions and the other specific ingredients employed, as illustrated in the examples, are presented as being typical and should not be construed to limit the invention unduly.

*Example I*

Freshly steam distilled furfural containing five per cent by weight of water was charged to a steel reaction vessel. Sufficient 1,3-butadiene was added to give a butadiene concentration of 4.0 per cent in the reaction mixture. The composition of the charge material was

| | Parts by weight |
|---|---|
| Furfural | 91.2 |
| Butadiene | 4.0 |
| Water | 4.8 |

The temperature within the reaction vessel was maintained at 260° F. for 70 hours. The reaction product was then transferred to a specially designed distilling flask and stripped of water and unreacted furfural and butadiene under an absolute pressure of from two to five mm. of mercury. A residue containing some furfural and the furfural-butadiene condensation products was transferred to a flask bearing a Vigreaux column and fractionated at pressure in the range 0.5-0.2 mm. of mercury. The data observed during this distillation are tabulated as follows:

| Cut No. | Kettle Temp., °F. | Press., mm. Hg | O. H. Temp., °F. | Corrected O. H. Temp., °F. | Product Distilled cc. | Product Distilled gms. | Sp. Gr. at 25° C. | Refractive Index at 20° C. |
|---|---|---|---|---|---|---|---|---|
| 1 | 113 | 1.5 | 99 | 370 | 5.0 | | | |
| 1 | 116 | 1.5 | 101 | 375 | 10.0 | | | |
| 1 | 116 | 1.5 | 99 | 370 | 20.0 | | | |
| 1 | 119 | 1.5 | 103 | 380 | 30.0 | | | |
| 1 | 116 | 1.5 | 96 | 368 | 40.0 | | | |
| 1 | 121 | 1.5 | 102 | 380 | 50.0 | | | |
| 1 | 127 | 2.0 | 105 | 372 | 60.0 | | | |
| 1 | 129 | 2.0 | 106 | 373 | 70.0 | | | |
| 1 | 142 | 2.0 | 105 | 372 | 90.0 | | | |
| 1 | 160 | 2.0 | 105 | 372 | 99.0 | 114.1 | 1.152 | 1.5254 |
| 2 | 220 | 2.0 | 105 | 372 | 6.0 | | | |
| 2 | 220 | 1.0 | 105 | 390 | 8.0 | | | |
| 2 | 230 | 1.0 | 146 | 440 | 9.0 | 10.2 | | |
| 3 | 226 | 2.0 | 175 | 460 | 0.0 | | | |
| 3 | 234 | 2.0 | 190 | 480 | 1.0 | | | |
| 3 | 236 | 2.0 | 200 | 490 | 2.5 | | | |
| 3 | 238 | 2.0 | 206 | 500 | 3.2 | | | |
| 3 | 248 | 2.0 | 219 | 516 | 4.4 | | | |
| 3 | 242 | 1.8 | 213 | 513 | 5.2 | | | |
| 3 | 258 | 2.0 | 222 | 522 | 10.0 | 11.17 | 1.117 | 1.5276 |
| 4 | 256 | 1.0 | 218 | 545 | 0.0 | | | |
| 4 | 256 | 1.0 | 225 | 555 | 10.0 | 11.13 | 1.113 | 1.5265 |
| 5 | 256 | 1.0 | 225 | 555 | 0.0 | | | |
| 5 | 320 | 0.5 | 255 | 625 | 10.0 | 11.21 | 1.121 | 1.5265 |
| 6 | 325 | 0.5 | 260 | 630 | 0.0 | | | |
| 6 | 342 | 0.5 | 270 | 645 | | 2.81 | | |
| Residue | | | | | | 16.0 | | |

In the above distillation, fraction 1 comprises recovered furfural. Fraction 2 represents the transition between furfural and the light reaction product and is a mixture of the two. Fraction 3 was an amber colored liquid and is typical of the light reaction product or "polymer." The first few milliliters of this fraction were slightly low-boiling and were probably contaminated with a little furfural. Fraction 4 can be regarded as the heart-cut of the light reaction product. Fraction 5 is similar to fraction 4. Fraction 6 comprised the so-called heavy "polymer" product. It consisted of a mixture of white crystals and a red viscous liquid. About 65 per cent of the total liquid product was the amber colored liquid designated as "light reaction product." Further investigation and identification (not specifically described herein) of the light reaction product thus formed showed the light product material to comprise a polycyclic aldehyde formed by the interreaction of two mols of butadiene with one mol of furfural and to have the empirical formula $C_{13}H_{16}O_2$ and the structure,

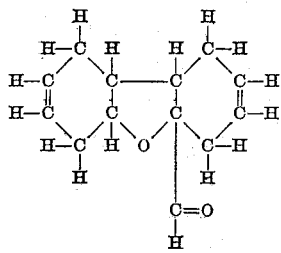

The fraction No. 6 comprising a so-called heavy product consisting of a mixture of white crystals and a red viscous liquid comprised about 4 per cent of the total product distilled, and was found to be a lactone characterized by the empirical formula $C_9H_{12}O_3$. The light products formed are defined as that material boiling above the furfural plateau and distilling at 260° F. at an absolute pressure of 0.5 mm. mercury which corresponds to 630° F. at 760 mm. absolute. Fractions 3 and 4 above are characterized by the following properties:

|  | Fraction 3 | Fraction 4 |
|---|---|---|
| Specific Gravity | 1.10 at 77° F | 1.13 at 68° F. |
| Refractive Index, at 68° F | 1.5254 | 1.5265. |
| Molecular Weight | 210 | 208. |
| Aldehyde Content | 99.0 percent | 83.5 percent. |
| Acidity |  | 0.82 percent (calculated as furoic acid). |

Example II

The following materials were evaluated as rubber plasticizers and extenders in a 74/26 butadiene-acrylonitrile copolymer prepared by emulsion polymerization:

(1) A condensation product fraction comprising 2,3,4,5 - bis($\Delta^2$ - butenylene) - tetrahydrofurfural of more than about 80 per cent purity obtained by the interaction of two mols 1,3-butadiene with one mol furfural and characterized by a boiling point of 239° F. @ 1.1 mm. mercury absolute, a specific gravity 20/20 of 1.120, and a refractive index 20/D of 1.5240.

(2) A polymeric residue obtained from a furfural side stream drawn from an extractive distillation system employing furfural as a selective solvent in the recovery of 1,3-butadiene from a $C_4$ hydrocarbon mixture. This polymeric residue was a brownish-black tarry residue substantially insoluble in water (about 5 per cent being dissolved on prolonged contact with water), and contained about 10 per cent water (occluded) and less than 1 per cent unreacted furfural; it had a density of 1.20 grams per cc., an acid number of 15 (mg. KOH/gram sample), and a bromine number, in $CCl_4$, of 122.3. This polymeric residue contained about 15 per cent 2,3,4,5-bis($\Delta^2$-butenylene)-tetrahydrofurfural.

(3) TP-90B, a well known liquid polyether of high molecular weight generally employed in low temperature plasticization, as a control, or reference for evalution of plasticizer materials (1) and (2) described immediately hereinabove.

(4) Dibutyl phthalate, as a control or reference for evaluation of plasticizer materials (1) and (2) described immediately hereinabove.

The following compounding recipe was employed:

| | Parts by weight |
|---|---|
| Butadiene-acrylonitrile copolymer | 100 |
| Philblack A [1] | 60 |
| Zinc oxide | 5 |
| Altax [2] | 1.5 |
| Stearic acid | 1.5 |
| Sulfur | 1.5 |
| Softener | 10 |

[1] Medium abrasion furnace black.
[2] Benzothiazyl disulfide.

The compounded stocks were each cured at 307° F. for 30 minutes. The following evaluation data were obtained:

| Plasticizer No.[a] | 80° F.[b] | | | 200° F., Tensile, p. s. i. | Percent Compression Set | Gehman Freeze Point, °C. |
|---|---|---|---|---|---|---|
|  | 300 Percent Modulus, p. s. i. | Tensile, p. s. i. | Percent Elongation |  |  |  |
| (1) | 2,260 | 2,550 | 340 | 1,390 | 8.9 | −33.9 |
| (2) | 2,270 | 2,630 | 345 | 1,270 | 7.1 | −26.7 |
| (3) | 1,590 | 2,840 | 440 |  | 15.0 | −41 |
| (4) | 1,380 | 2,560 | 460 |  | 15.0 | −37 |

OVEN AGED 24 HOURS AT 212° F.

| | | | | | | |
|---|---|---|---|---|---|---|
| (1) |  | 2,840 | 290 |  |  |  |
| (2) | 2,830 | 2,940 | 315 |  |  |  |
| (3) | 2,670 | 3,060 | 330 |  |  |  |
| (4) | 2,440 | 3,180 | 380 |  |  |  |

[a] As identified immediately hereinabove.
[b] 45 minute cures on aged stress-strain values.

Example III

Variable quantities of the 2,3,4,5-bis($\Delta^2$-butenylene)-tetrahydrofurfural, described in Example II as plasticizer (1) were evaluated in a 74/26 butadiene-acrylonitrile copolymer which was prepared by emulsion polymerization. The high molecular weight polyether, designated as TP-90B was used as a control. The compounding recipe and procedure were the same as that of Example II. The following evaluation data were obtained:

30 minutes at 307° F. and physical properties of each vulcanizate determined. A control was run using a blend of equal parts of Paraflux (an asphaltic flux) with Circosol-2XH (a petroleum hydrocarbon softener containing hydrocarbons of high molecular weight in the form of a heavy, viscous, transparent, pale green, odorless liquid of low volatility; sp. gr. 0.940; Saybolt viscosity

| Softener | PHR [1] | 80° F. | | | 200° F.,[2] Tensile, p. s. i. | Percent Compression Set | Compounded MS 1½ | Gehman Freeze Point, °C. |
|---|---|---|---|---|---|---|---|---|
| | | 300 Percent Modulus, p. s. i. | Tensile, p. s. i. | Percent Elongation | | | | |
| 2,3,4,5 - bis - (Δ² - butenylene)-tetrahydrofurfural | 10 | 1,490 | 2,240 | 410 | 1,020 | 13.8 | 43 | −37 |
| 2,3,4,5 - bis - (Δ² - butenylene)-tetrahydrofurfural | 30 | 360 | 860 | 605 | 320 | 23.8 | 21.5 | −32.5 |
| TP-90B | 10 | 2,250 | 2,390 | 315 | 1,020 | 14.3 | 39.5 | −43 |

OVEN AGED 24 HOURS AT 212° F.

| | | | | | | | | |
|---|---|---|---|---|---|---|---|---|
| 2,3,4,5 - bis - (Δ² - butenylene)-tetrahydrofurfural | 10 | 2,380 | 2,830 | 345 | | | | |
| 2,3,4,5 - bis - (Δ² - butenylene)-tetrahydrofurfural | 30 | 1,460 | 2,180 | 445 | | | | |
| TP-90B | 10 | | 2,940 | 225 | | | | |

[1] Parts per 100 parts rubber (by weight).
[2] 45 minute cure.

*Example IV*

2,3,4,5-bis(Δ²-butenylene)-tetrahydrofurfural (described in Example II as plasticizer (1), and a crude reaction product containing this compound and described in Example II as plasticizer (2) were evaluated as plasticizers in a tread recipe using a 41° F., 60 Mooney (ML-4), 71/29 butadiene-styrene elastomer. Stocks were compounded using the following recipe:

|  | Parts by weight |
|---|---|
| Butadiene-styrene rubber | 100 |
| Philblack O [1] | 50 |
| Zinc oxide | 3 |
| Stearic acid | 1 |
| Flexamine [2] | 1 |
| Sulfur | 1.75 |
| Santocure [3] | 1 |
| Softener | 10 |

[1] High abrasion furnace black.
[2] A physical mixture containing 65 per cent of a complex diarylamine ketone reaction product and 35 per cent of N,N'-diphenyl-p-phenylenediamine.
[3] N-cyclohexyl-2-benzothiazolesulfenamide.

The compounded stocks were milled and cured at 100° F., about 2000 seconds). The following evaluation data were obtained:

| | Plasticizer | | Circosol-Paraflux Blend |
|---|---|---|---|
| | (1) | (2) | |
| Unaged Samples: | | | |
| Stress-strain properties at 80° F.— | | | |
| 300 Percent Modulus, p. s. i. | 780 | 940 | 1,170 |
| Tensile, p. s. i. | 3,100 | 3,280 | 3,560 |
| Elongation, Percent | 715 | 710 | 610 |
| Stress-strain properties at 200° F., 45 min. cures, | | | |
| Tensile, p. s. i. | 2,050 | 2,330 | 2,020 |
| Hysteresis, Δ T° F. | 92.6 | 96.6 | 66.9 |
| Resilience, Percent | 58.0 | 55.6 | 61.5 |
| Flex life, M. | 24.9 | 58 | 31.5 |
| Shore hardness | 53 | 59 | 54 |
| Compression set, Percent | 20.1 | 14.4 | 17.9 |
| Compounded MS 1½ | 36 | 46 | 37.5 |
| Extrusion at 250° F.— | | | |
| Inches/minute | 42.2 | 36 | 40.1 |
| Grams/minute | 103 | 90 | 100 |
| Meter tack, separation load, grams— | | | |
| 1 Day | 125 | 115 | <25 |
| 7 Days | 140 | 150 | 35 |
| Oven Aged 24 Hours at 212° F.: | | | |
| Stress-strain properties at 80° F.— | | | |
| 300 Percent Modulus, p. s. i. | 1,900 | 1,620 | 2,170 |
| Tensile, p. s. i. | 3,620 | 3,480 | 3,530 |
| Elongation, Percent | 490 | 545 | 425 |
| Hysteresis, Δ T° F. | 67.9 | 76.3 | 53.0 |
| Resilience, Percent | 63.2 | 60.4 | 67.7 |
| Flex life, M. | 12.3 | 23.8 | 10.7 |
| Shore hardness | 62 | 65.5 | 60 |

Example V

The crude reaction product containing 2,3,4,5-bis($\Delta^2$-butenylene)-tetrahydrofurfural, designated as plasticizer (2) in Example III, was evaluated in varied quantities in the recipe of Example IV. Three controls were run: (1) a blend of equal parts of Circosol-2XH with Paraflux; (2) Paraflux; and (3) Asphalt #6 (an asphalt-type softener). The following evaluation data were obtained.

| | | Parts by weight |
|---|---|---|
| Butadiene-styrene rubber | | 100 |
| Philblack | | 50 |
| Zinc oxide | | 3 |
| Stearic acid | | 1 |
| Flexamine | | 1 |
| Sulfur | | 1.75 |
| Santocure | | 1 |
| Conventional softener [1] | | 10 |
| Butadiene/furfural condensation product [2] | | 1,3,5 |

[1] Paraflux, Circosol-2XH, or Asphalt #6.
[2] Softener 2 as in Example II.

| Plasticizer | PHR[2] | 80° F. | | | 200° F.[3] Tensile, p.s.i. | ΔT, ° F. | Percent Resilience | Flex Life, M | Shore Hardness | Percent Compression Set | Compounded MS 1½ | Extrusion at 250° F. | | Hand Tack |
|---|---|---|---|---|---|---|---|---|---|---|---|---|---|---|
| | | 300 Percent Modulus, p.s.i. | Tensile, p.s.i. | Percent Elongation | | | | | | | | In./Min. | Gm./Min. | |
| 2 [1] | 5 | 1,120 | 3,460 | 645 | 2,510 | 87.2 | 56.6 | 39.0 | 60 | 19.1 | 51 | 40 | 100 | 6 |
| 2 | 10 | 1,000 | 3,210 | 680 | 2,250 | 94.8 | 55.5 | 43.5 | 61 | 14.8 | 51 | 35 | 94 | 6 |
| 2 | 15 | 830 | 3,050 | 735 | 2,020 | 100.6 | 53.7 | [4] 55 | 61 | 12.6 | 50 | 39.2 | 96.1 | 6 |
| Circosol-Paraflux | 10 | 1,140 | 3,400 | 630 | 2,110 | 71.6 | 60.9 | 24.4 | 55 | 18.6 | 42 | 36 | 97.8 | 3 |
| Paraflux | 10 | 1,110 | 3,570 | 645 | 2,310 | 72.6 | 59.9 | 40.0 | 56 | 18.4 | 42 | 38.5 | 100 | 3 |
| Asphalt #6 | 10 | 1,200 | 3,560 | 660 | 2,200 | 73.6 | 57.8 | 31.7 | 59 | 21.0 | 48 | 36.8 | 98.5 | 5 |

OVEN AGED 24 HOURS AT 212° F.

| 2 [1] | 5 | 2,080 | 3,620 | 480 | | 68.9 | 62.2 | 10.1 | 65 | | | | | |
| 2 | 10 | 1,730 | 3,520 | 535 | | 76.3 | 57.6 | 19.1 | 66 | | | | | |
| 2 | 15 | 1,430 | 3,220 | 605 | | 83.8 | 56.9 | 43.5 | 66 | | | | | |
| Circosol-Paraflux | 10 | 1,980 | 3,510 | 460 | | 57.1 | 64.2 | 10.5 | 61 | | | | | |
| Paraflux | 10 | 2,040 | 3,730 | 495 | | 58.5 | 65.1 | 15.3 | 62 | | | | | |
| Asphalt #6 | 10 | 2,030 | 3,430 | 455 | | 61.2 | 62.7 | 4.8 | 68 | | | | | |

[1] Plasticizer (2) of Example II.
[2] Parts per 100 parts rubber by weight.
[3] 45 minute cures.
[4] Percent broken at 50,000 flexures.

Example VI

The crude reaction product containing 2,3,4,5-bis($\Delta^2$-butenylene)-tetrahydrofurfural, designated as plasticizer (2) in Example II was evaluated in varied quantities in conjunction with Paraflux, Circosol-2XH, and Asphalt #6. Evaluation of these plasticizer mixtures was made in the tread recipe using 41° F. butadiene-styrene rubber of Example IV. Stocks were compounded using the following recipe:

The stocks were milled and cured 30 minutes at 307° F. The following evaluation data were obtained:

| Plasticizer | PHR[2] | 80° F. | | | 200° F.[1] Tensile, p.s.i. | ΔT, ° F. | Percent Resilience | Flex Life, M | Shore Hardness | Percent Compression Set | Compounded MS 1½ | Extrusion at 250° F. | |
|---|---|---|---|---|---|---|---|---|---|---|---|---|---|
| | | 300 percent Modulus, p.s.i. | Tensile, p.s.i. | Percent Elongation | | | | | | | | In./Min. | Gm./Min. |
| Paraflux | 1 | 900 | 3,300 | 710 | 2,130 | 81.8 | 57.8 | 33.4 | 54 | 19.0 | 41.5 | 33.2 | 92.5 |
| Do | 3 | 760 | 3,070 | 750 | 2,290 | 90.5 | 56.4 | 39.0 | 55 | 20.0 | 41.5 | 34 | 96 |
| Do | 5 | 630 | 2,960 | 835 | 1,680 | 104.0 | 54.6 | 43.3 | 55 | 19.8 | 42 | 34 | 95 |
| Circosol-2XH | 1 | 1,030 | 3,360 | 640 | 2,330 | 80.1 | 59.2 | 16.7 | 54 | 20.9 | 39 | 34 | 93.5 |
| Do | 3 | 720 | 3,070 | 745 | 1,870 | 100.0 | 57.4 | 33.1 | 52 | 21.0 | 39 | 34 | 95.5 |
| Do | 5 | 620 | 2,810 | 780 | 1,840 | 112.1 | 56.5 | 33.3 | 54 | 20.1 | 39 | 34 | 96 |
| Asphalt #6 | 3 | 870 | 3,160 | 725 | 2,250 | 92.4 | 55.4 | 42.5 | 56 | 18.6 | 48 | 34 | 95.5 |
| Do | 5 | 660 | 2,780 | 830 | 1,780 | 112.2 | 53.7 | 56.7 | 55 | 19.7 | 47.5 | 33 | 93 |
| Paraflux | | 720 | 2,990 | 725 | 1,700 | 74.7 | 59.9 | 35.7 | 55 | 17.9 | 43.5 | 32.5 | 95 |
| Circosol-2XH | | 1,170 | 3,530 | 620 | 2,060 | 74.3 | 60.6 | 16.5 | 54 | 21.0 | 41 | 33.5 | 95.5 |
| Asphalt #6 | | 1,260 | 3,530 | 615 | 1,860 | 77.1 | 58.5 | 20.4 | 58 | 21.0 | 48.5 | 33.8 | 94. |

OVEN AGED 24 HOURS AT 212° F.

| Paraflux | 1 | 1,720 | 3,620 | 530 | | 67.6 | 63.6 | 6.3 | 62.5 | | | | |
| Do | 3 | 1,510 | 3,400 | 570 | | 67.6 | 61.5 | 10.6 | 62 | | | | |
| Do | 5 | 1,280 | 3,330 | 600 | | 73.6 | 59.7 | 15.8 | 62 | | | | |
| Circosol-2XH | 1 | 2,030 | 3,780 | 470 | | 59.9 | 65.8 | 8.0 | 60.5 | | | | |
| Do | 3 | 1,570 | 3,540 | 540 | | 63.2 | 62.5 | 13.1 | 60 | | | | |
| Do | 5 | 1,340 | 3,300 | 555 | | 68.6 | 62.5 | 15.4 | 60.5 | | | | |
| Asphalt #6 | 3 | 1,720 | 3,420 | 535 | | 67.6 | 59.9 | 13.5 | 64 | | | | |
| Do | 5 | 1,400 | 3,120 | 580 | | 71.9 | 58.6 | 17.7 | 63 | | | | |
| Paraflux | | 2,050 | 3,730 | 495 | | 62.8 | 63.9 | 8.1 | 62.5 | | | | |
| Circosol-2XH | | 2,290 | 3,500 | 430 | | 54.7 | 66.7 | 11.4 | 62 | | | | |
| Asphalt #6 | | 2,230 | 3,650 | 480 | | 62.2 | 64.0 | 6.4 | 66 | | | | |

[1] 45 minute cures.
[2] Parts per 100 parts by weight of the crude 2,3,4,5-bis ($\Delta^2$-butenylene)-tetrahydrofurfural (plasticizer No. 2 of Example II).

Example VII 2,3,4,5-bis($\Delta^2$-butenylene)-tetrahydrofurfural and a crude reaction product containing this compound (both materials as described in Example II and designated respectively as plasticizers (1) and (2)) were evaluated alone and in mixtures with Staybelite Resin (hydrogenated rosin) as plasticizers in a carcass recipe using a 41° F., 60 Mooney (ML–4) 71/29 butadiene-styrene elastomer. A control was run using a mixture of Paraflux with Staybelite Resin. Stocks were compounded in accordance with the following recipe:

| | Parts by weight |
|---|---|
| Butadiene-styrene rubber | 100 |
| Philblack O | 25 |
| Zinc oxide | 3 |
| Stearic acid | 1 |
| Agerite Resin D [1] | 1 |
| Sulfur | 2.5 |
| Santocure | 1 |
| A–32 [2] | 0.2 |
| Softener | 7.5 |

[1] Polymerized trimethyldihydroquinoline.
[2] Reaction product of butyraldehyde and butylidene aniline.

The stocks were milled and cured 30 minutes at 307° F. The following evaluation data were obtained:

| Plasticizer | 80° F. | | | 200° F.,[1] Tensile, p. s. i. | ΔT, ° F. | Percent Resilience | Flex Life, M | Shore Hardness | Compounded MS 1½ | Hand Tack |
|---|---|---|---|---|---|---|---|---|---|---|
| | 300 Percent Modulus, p. s. i. | Tensile, p. s. i. | Percent Elongation | | | | | | | |
| Plasticizer (1) of Example II | 800 | 3,260 | 605 | 870 | 40.9 | 73.0 | 7.2 | 49 | 31.5 | 6 |
| Plasticizer (2) of Example II | 640 | 3,690 | 700 | 1,120 | 46.3 | 71.4 | 16.6 | 51 | 32.5 | 7 |
| 75 Percent Plasticizer (1)+25 Percent Staybelite Resin | 800 | 3,760 | 630 | 1,070 | 43.3 | 74.0 | 9.2 | 50.5 | 30.5 | 6 |
| 75 Percent Plasticizer (2)+25 Percent Staybelite Resin | 700 | 3,750 | 680 | 1,010 | 45.6 | 72.1 | 14.7 | 53 | 32.0 | 7 |
| 75 Percent Paraflux+25 Percent Staybelite Resin | 870 | 2,790 | 550 | 850 | 37.1 | 74.1 | 6.9 | 52 | 31.5 | 7 | in the $R'_m$ and in the $R'_n$ in each case, not greater than three and at least two of the $R'_m$ and of the $R'_n$ are hydrogen.

2. As a new composition a rubbery sulfur-vulcanizable organic plastic substance containing unsaturated carbon-to-carbon bonds, incorporated with an aldehyde characterized by the structural formula

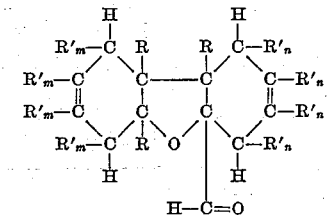

where each R is of the group consisting of hydrogen and methyl and at least one is hydrogen, and each R' is of the group consisting of hydrogen and an alkyl group having not more than three carbon atoms with the sum of the carbon atoms than three and at least two of the R'm and of the R'n are hydrogen.

5. As a new composition 100 parts by weight of a rubbery copolymer of a conjugated diene and a different unsaturated organic compound copolymerizable therewith compounded with 1 to 50 parts by weight of a plasticizer material comprising 2,3,4,5-bis($\Delta^2$-butenylene)-tetrahydrofurfural.

6. A composition of claim 5 wherein said plasticizer material is a tarry residual by-product containing said tetrahydrofurfural and is recovered from furfural previously utilized as a selective solvent in the extractive distillation of 1,3-butadiene from a $C_4$ hydrocarbon mixture.

7. A composition of claim 5 wherein said plasticizer material is recovered from a steam condensate formed during steam distillation of furfural previously utilized as a selective solvent in the extractive distillation of 1,3-butadiene from a $C_4$ hydrocarbon mixture.

8. As a new composition 100 parts by weight of a rubbery butadiene-styrene copolymer compounded with from 1 to 50 parts by weight of 2,3,4,5-bis($\Delta^2$-butenylene)-tetrahydrofurfural.

9. As a new composition 100 parts by weight of a rubbery butadiene-acrylonitrile copolymer compounded with from 1 to 50 parts by weight of 2,3,4,5-bis($\Delta^2$-butenylene)-tetrahydrofurfural.

10. The product of vulcanization of 100 parts by weight of a rubbery sulfur-vulcanizable organic plastic substance containing unsaturated carbon-to-carbon bonds which has been vulcanized with sulfur in the presence of from 1 to 50 parts by weight of an aldehyde characterized by the structural formula

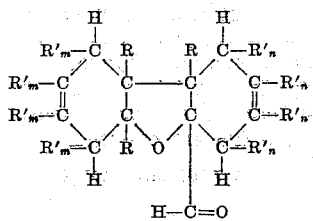

where each R is of the group consisting of hydrogen and methyl and at least one is hydrogen, and each R' is of the group consisting of hydrogen and an alkyl group having not more than three carbon atoms with the sum of the carbon atoms in the R'm and in the R'n in each case, not greater than three and at least two of the R'm and of the R'n are hydrogen.

11. The product of vulcanization of 100 parts by weight of a sulfur-vulcanizable synthetic rubber-like material which has been vulcanized with sulfur in the presence of 1 to 50 parts by weight of an aldehyde characterized by the structural formula

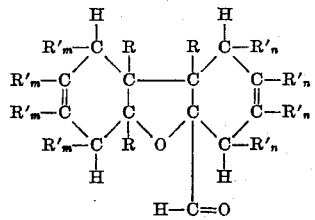

where each R is of the group consisting of hydrogen and methyl and at least one is hydrogen, and each R' is of the group consisting of hydrogen and an alkyl group having not more than three carbon atoms with the sum of the carbon atoms in the R'm and in the R'n in each case, not greater than three and at least two of the R'm and of the R'n are hydrogen.

12. A vulcanizate of claim 11 wherein said synthetic rubber-like material is a rubbery copolymer of a conjugated diene and an unsaturated organic compound copolymerizable therewith.

13. The product of vulcanization of 100 parts by weight of a sulfur-vulcanizable synthetic rubber-like material which has been vulcanized with sulfur in the presence of a product fraction formed during the liquid phase condensation of two mols of 1,3-butadiene with one mol of furfural at a temperature within the range of 200–325° F. for a period of from 5–100 hours and containing 2,3,4,5-bis($\Delta^2$-butenylene)-tetrahydrofurfural.

14. A vulcanizate of claim 13 wherein said synthetic rubber-like material is a copolymer of butadiene and styrene.

15. A vulcanizate of claim 13 wherein said synthetic rubber-like material is a copolymer of butadiene and acrylonitrile.

16. The product of vulcanization of 100 parts by weight of a rubbery butadiene-styrene copolymer vulcanized with sulfur in the presence of from 1 to 50 parts by weight of 2,3,4,5-bis($\Delta^2$-butenylene)-tetrahydrofurfural.

17. The product of vulcanization of 100 parts by weight of a rubbery butadiene-acrylonitrile copolymer vulcanized with sulfur in the presence of from 1 to 50 parts by weight of 2,3,4,5-bis($\Delta^2$-butenylene)-tetrahydrofurfural.

18. A produce of vulcanization of 100 parts by weight of a rubbery butadiene-styrene copolymer vulcanized with sulfur in the presence of from 1 to 50 parts by weight of a tarry residual by-product containing 2,3,4,5-bis($\Delta^2$-butenylene)-tetrahydrofurfural and recovered from furfural previously utilized as a selective solvent in the extractive distillation of 1,3-butadiene from a $C_4$ hydrocarbon mixture.

19. A vulcanizate of claim 18 wherein said tarry residue contains at least 15 parts by weight of said 2,3,4,5-bis($\Delta$-butenylene)-tetrahydrofurfural.

20. A product of vulcanization of 100 parts by weight of a rubbery butadiene-acrylonitrile copolymer vulcanized with sulfur in the presence of from 1 to 50 parts by weight of a tarry residual by-product containing 2,3,4,5-bis($\Delta^2$-butenylene)-tetrahydrofurfural and recovered from furfural previously utilized as a selective solvent in the extractive distillation of 1,3-butadiene from a $C_4$ hydrocarbon mixture.

21. A vulcanizate of claim 20 wherein said tarry residue contains at least 15 parts by weight of said 2,3,4,5-bis($\Delta^2$-butenylene)-tetrahydrofurfural.

22. As a new composition 100 parts by weight of a synthetic sulfur-vulcanizable rubber-like material having a raw Mooney viscosity of at least 90 (ML-4) incorporated with from 15 to 50 parts by weight of an aldehyde characterized by the structural formula

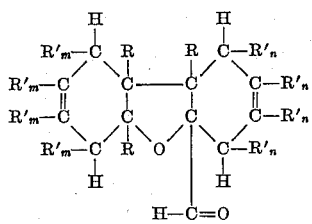

where each R is of the group consisting of hydrogen and methyl and at least one is hydrogen, and each R' is of the group consisting of hydrogen and an alkyl group having not more than three carbon atoms with the sum of the carbon atoms in the R'm and in the R'n in each case, not greater than three and at least two of the R'm and of the R'n are hydrogen.

23. The composition of claim 22 wherein said aldehyde is 2,3,4,5-bis($\Delta^2$-butenylene)-tetrahydrofurfural and said synthetic elastomer is a rubbery polymer of a conjugated hydrocarbon diene.

24. As a new composition 100 parts by weight of a synthetic sulfur-vulcanizable rubber-like material having a raw Mooney viscosity of from 40 to 90 (ML-4) incorporated with from 2 to 10 parts by weight of an aldehyde characterized by the structural formula

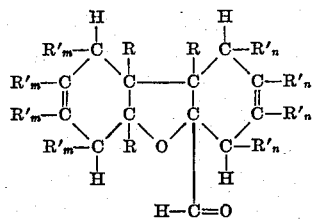

where each R is of the group consisting of hydrogen and methyl and at least one is hydrogen, and each R' is of the group consisting of hydrogen and an alkyl group having not more than three carbon atoms with the sum of the carbon atoms in the R'm and in the R'n in each case, not greater than three and at least two of the R'm and of the R'n are hydrogen.

25. As a new article of manufacture a gasket comprising vulcanized rubbery butadiene-acrylonitrile copolymer compounded with an aldehyde characterized by the structural formula

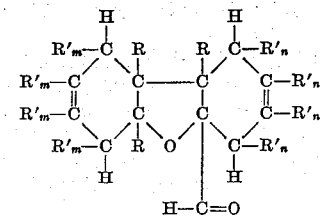

where each R is of the group consisting of hydrogen and methyl and at least one is hydrogen, and each R' is of the group consisting of hydrogen and an alkyl group having not more than three carbon atoms with the sum of the carbon atoms in the R'm and in the R'n in each case, not greater than three and at least two of the R'm and of the R'n are hydrogen.

26. As a new article of manufacture a tank, a liner bonded to said tank and a liquid hydrocarbon fuel contained within said liner, said liner being fabricated from a vulcanized rubbery butadiene-acrylonitrile copolymer compounded with an aldehyde characterized by the structural formula

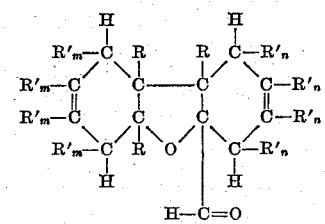

where each R is of the group consisting of hydrogen and methyl and at least one is hydrogen, and each R' is of the group consisting of hydrogen and an alkyl group having not more than three carbon atoms with the sum of the carbon atoms in the R'm and in the R'n in each case, not greater than three and at least two of the R'm and of the R'n are hydrogen.

No reference cited.